United States Patent [19]

Tamura

[11] Patent Number: 5,282,311
[45] Date of Patent: Feb. 1, 1994

[54] HARNESS PRODUCING APPARATUS AND A HARNESS PRODUCING METHOD

[75] Inventor: Yoshikazu Tamura, Yokkaichi, Japan

[73] Assignee: Sumitomo Wiring Systems, Ltd., Japan

[21] Appl. No.: 21,280

[22] Filed: Feb. 22, 1993

[30] Foreign Application Priority Data

Mar. 2, 1992 [JP] Japan ................. 4-81509

[51] Int. Cl.⁵ .............. H01R 43/00; H02G 1/12
[52] U.S. Cl. ..................... 29/825; 81/9.51;
    29/33 F; 29/428; 29/429; 29/564.9
[58] Field of Search ............. 81/9.51; 29/825, 755,
    29/564.4, 428, 429, 330 F; 83/923

[56] References Cited

U.S. PATENT DOCUMENTS

| | | | |
|---|---|---|---|
| 3,363,309 | 1/1968 | Logan et al. | 81/9.51 X |
| 3,895,426 | 7/1975 | Papsdorf | 81/9.51 X |
| 4,020,548 | 5/1977 | Pohl | 29/825 |
| 4,091,695 | 5/1978 | Funcik et al. | 81/9.51 |
| 4,261,231 | 4/1981 | Bleakley | 81/9.51 |
| 4,388,142 | 6/1983 | Hembert | 29/825 X |
| 5,142,950 | 9/1992 | Takano et al. | 81/9.51 |

FOREIGN PATENT DOCUMENTS

8217  1/1991  Japan ................ H01B 13/00

*Primary Examiner*—Carl J. Arbes
*Attorney, Agent, or Firm*—Jordan B. Bierman

[57] ABSTRACT

A wire-travelling path between feed rollers 111 and an intermediate stripping unit 200 is set by an adjusting unit 100 disposed therebetween so that the distance of a wire 50 from a cutting-off position of cutters 141 to a cutting-into position of cutters 202 is equal to the sum of the length of the cutting-off wire and the distance from the end of the cutting-off wire to one end of the intermediate stripped area of the wire. If the wire 50 is fed by the length to be cut off, the wire 50 can be positioned simultaneously at the cutters 141 and 202. Consequently, it is possible to carry out only one time of feeding and resting of the feed rollers 111 in a cycle of operation and to reduce the rest period from the time when the feed rollers rest to the time of a following treatment, thereby producing a harness efficiently.

2 Claims, 13 Drawing Sheets

HARNESS PRODUCING APPARATUS AND A HARNESS PRODUCING METHOD

BACKGROUND OF THE INVENTION

1. Field of the Invention

This invention relates to an apparatus and a method for producing a harness, which include a treatment of stripping the cover on an intermediate area of a wire as well as a treatment of working an end of the wire.

2. Statement of the Prior Art

In a harness for a motorcar, the cover on a wire is stripped off at an intermediate area to connect a branch wire to the intermediate area.

Heretofore, such harness has been produced by stripping the cover of the wire at an intermediate area by using a wire stripper or the like by hand after the wire had been worked at the end by a single purpose machine.

For convenience of explanation, a prior harness producing apparatus will be described below by referring to FIGS. 18 to 20.

Figure 18:
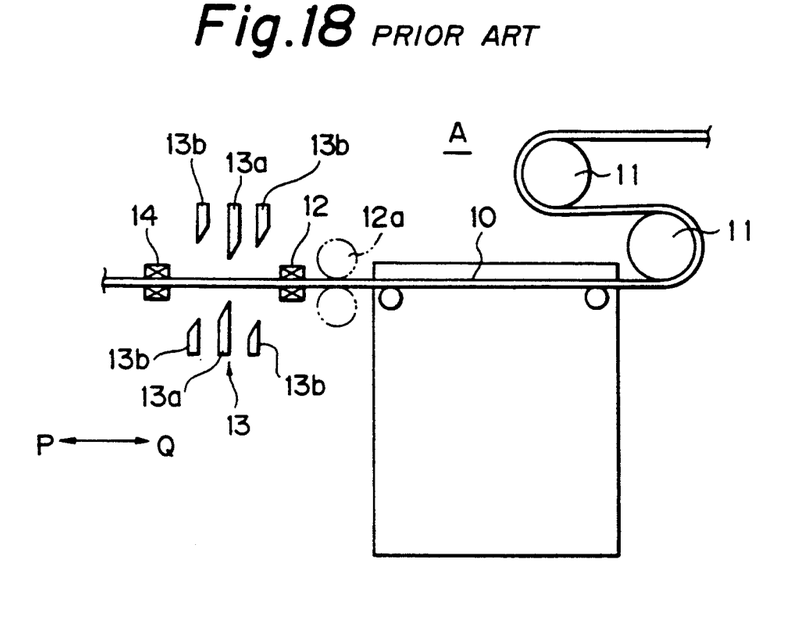
FIG. 18 is a side view of a conventional harness producing apparatus, which illustrates an operation of the apparatus.
Figure 19:
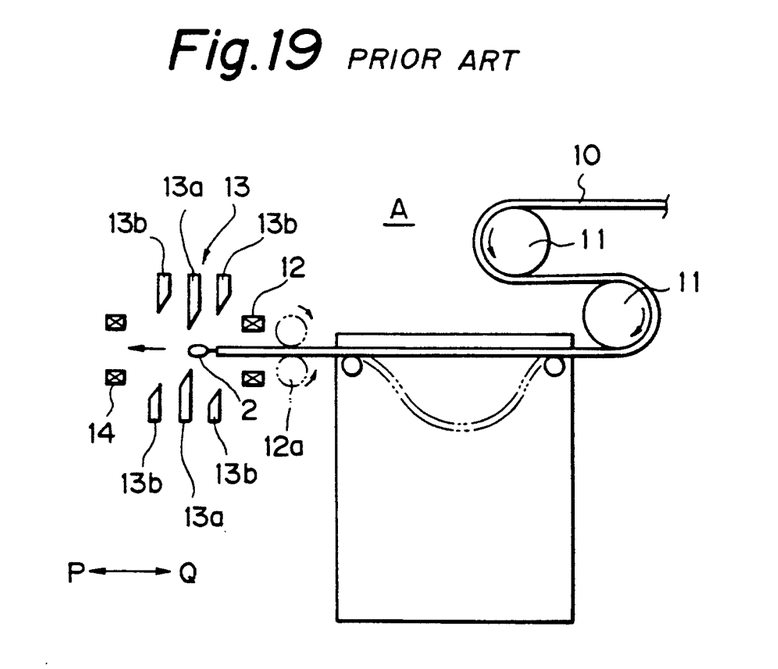
FIG. 19 is another side view of this conventional harness producing apparatus, which illustrates an operation of the apparatus.
Figure 20:
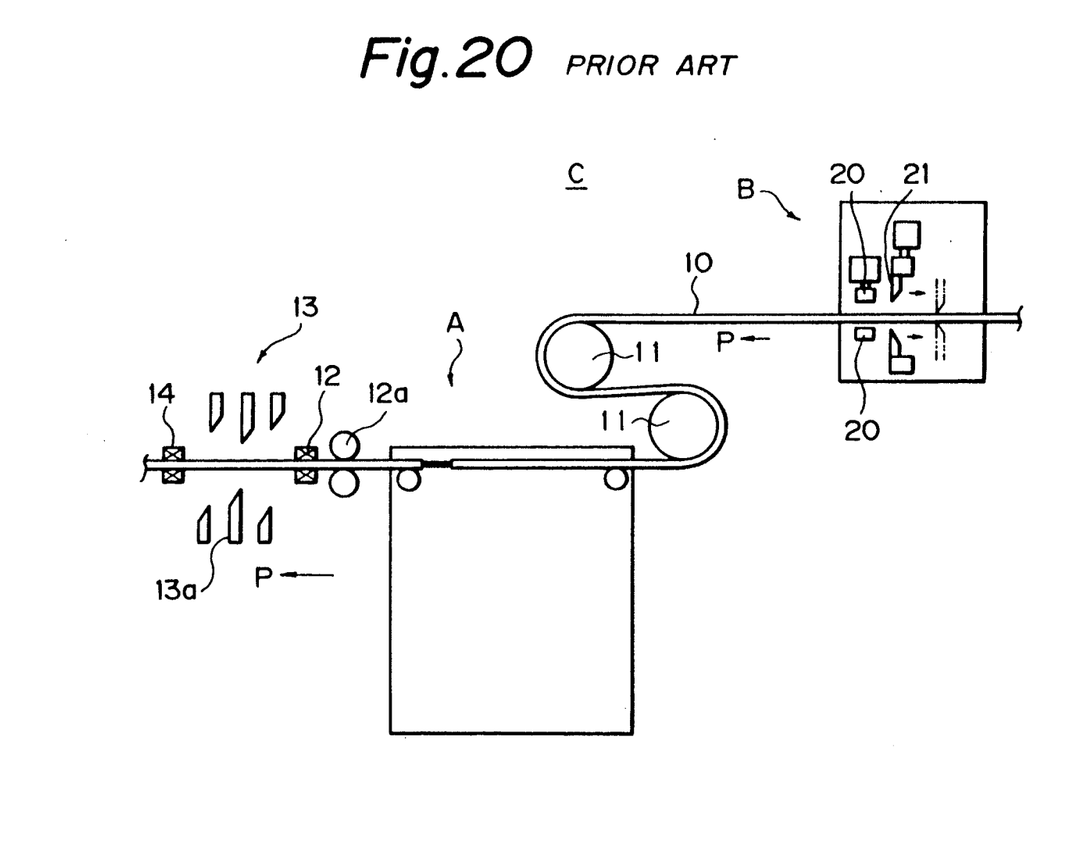
FIG. 20 is a schematic side view of another conventional harness producing apparatus.

FIGS. 18 and 19 are side views of a conventional harness producing apparatus, which illustrate operations of the apparatus. FIG. 20 is a schematic side view of another conventional harness producing apparatus.

A prior harness producing apparatus A, as shown in, for example, FIG. 18, is provided along a passing line of a wire 10 with, in order, a pair of feed rollers 11, a pair of draw rollers 12a, a front side clamp 12, a cutter assembly 13, and a rear side clamp 14. The wire is held between both clamps 12 and 14 while the cutter assembly 13 is closed in synchronization with the clamping of the wire by the clamps 12 and 14. Then, a pair of central cutting-off cutters 13a in the cutter assembly 13 cut off the wire 10, while two pairs of cutting-into cutters 13b in opposite sides of the cutter assembly 13 cut into the outer cover of the wire 10. The front side clamp 12 moves in the direction shown by the arrow Q while the cutters 13b cut into the cover, thereby stripping the cover on the end of the wire 10 which is held in the front side clamp 12 (hereinafter referred to as the remaining wire 10). In connection with this stripping process, the rear side clamp 14 moves in the direction shown by the arrow P, thereby stripping the cover on the end of the wire 10 which is held in the rear side clamp 14 (hereinafter referred to as the cut-off wire 10).

Then, the remaining wire 10 together with the front side clamp 12 is moved in a direction perpendicular to the paper surface of FIG. 18 and a terminal 2 (see FIG. 19) is pressed on the stripped end of the remaining wire 10 by a terminal-pressing machine (not shown). After pressing the terminal, the front side clamp 12 is returned to the original position.

Meanwhile, the rear clamp 14 is moved in a direction perpendicular to the paper surface of FIG. 18 and a terminal (not shown) is pressed on the stripped end of the cut-off wire 10 by a terminal-pressing machine (not shown). Then the clamp 14 releases the cut-off wire 10 at a given discharge position and is returned to the original position.

As shown in FIG. 19, when both clamps 12 and 14 are open and the pair of feed rollers 11 are driven so that the wire is fed toward the draw rollers 12a, the draw rollers 12a are driven with a slight time lag after feeding the wire so that the wire 10 is fed toward the rear side clamp 14 as shown in FIG. 18.

The covers on the opposite ends of the wire are stripped and the cut-off wire (harness) with the terminals 2 pressed on the opposite stripped ends are successively produced by repeating the above processes.

A plurality of the harnesses thus produced are bundled and transferred to the next step. Then, as described above, the harness is stripped at the intermediate area by hand.

In such a harness producing method, however, since the stripping treatment at the intermediate area is effected by hand, the precision of stripping is scattered due to different spersonal abilities and thus it is difficult to stabilize the quality of the harness. Further, an additional step of transferring the wire is necessary to carry a bundle of the harnesses produced by the apparatus A to the next step. This results in an increase in the number of steps.

Accordingly, it has been desired to automatically effect a series of working operations from the wire-end treatment to the stripping treatment at the intermediate area in order to overcome the above problems. As shown in FIG. 20, it has been first proposed to form a unit C by combining the above harness producing apparatus A with an existing stripping apparatus B.

In this unit C, after the wire 10 is set in the stripping apparatus B and in the harness producing apparatus A, the apparatuses A and B are driven. The wire 10 is cut off, the covers on the opposite ends of the cut-off wire are stripped and the terminals are pressed on the stripped ends in unit C.

Then, the feed rollers are driven so that the wire 10 is fed in wire-feeding direction P by a given length. One end of an intermediate area of the wire 10 to be stripped is positioned in opposition to the top of the cutters 21 in the stripping apparatus B. After the wire 10 is held in a clamp 20 in the stripping apparatus B, the cutters 21 are closed so that the cutters 21 cut into the outer cover of the wire 10. Then the cutters 21 are moved along the wire 10 to the other end of the intermediate area to be stripped while the cutters 21 cut into the cover. The cover at the one end of the intermediate area is cut away from the remaining cover and compressed toward the other end of the intermediate area, thereby stripping the cover at the intermediate area.

After the clamp 20 releases the wire 10, the feed rollers 11 and the draw rollers 12a are driven so that the wire 10 is fed along direction P toward the cutter assembly 13. At this time, the length of the cut-off wire (harness) corresponds to the sum of the feeding distances of the wire before and after stripping the intermediate area. Accordingly, the position on the wire 10 to be cut off next is set in opposition to the top of the cutters 13a.

Thus, one cycle is completed. Harnesses stripped at the intermediate area are successively produced by repeating the above processes.

Unit C can automatically carry out a series of working processes from the end treatment, such as the cutting-off treatment, end-stripping treatment, terminal-pressing treatment and the like, to the intermediate stripping treatment, thereby stabilizing the quality of the harness, eliminating the wire-transferring process between the end treatment and the intermediate treatment, and reducing the number of steps.

In unit C, however, since the wire is positioned by driving the feed rollers 11 during the intermediate stripping treatment and the cutting-off treatment in one cycle, the feed rollers 11 should be driven twice in one cycle. In general, it is necessary to set a given rest period from the time immediately after the feed rollers (and the draw rollers 12a) are stopped to the time when the next treatment is started. Accordingly, if the number of times of feeding and resting the feed rollers 11 increase, the rest period is correspondingly elongated, the period for a cycle becomes longer, and it is difficult to efficiently produce the harness.

SUMMARY OF THE INVENTION

A first object of the present invention is to provide an apparatus for producing in a few steps a harness with a stable quality, the cover of which is stripped at an intermediate area.

A second object is to provide a method for producing the above harness.

In order to achieve the first object, an apparatus for producing a harness in which the cover of a cut-off wire is stripped at an intermediate area, in accordance with the present invention, comprises:

means for intermittently feeding a wire by a given length along its longitudinal direction;

means for stripping the cover of the wire at an intermediate area, said means being disposed upstream of said feeding means in the wire-feeding direction and provided with first cutters adapted to cut into at least one end of the intermediate area of the cover of the wire;

means for treating an end of the wire, said means being disposed downstream from said feeding means in the wire-feeding direction and provided with second cutters adapted to cut off the wire fed from said feeding means; and means disposed between said intermediate stripping means and said end-treating means for adjusting the wire-travelling path between both of said means.

In order to achieve the second object, a method for producing a harness in which the cover of a cut-off wire is stripped at an intermediate area, in accordance with the present invention, comprises the steps of:

intermittently feeding a wire by a given length along its longitudinal direction by feeding means;

stripping the cover of the wire at an intermediate area during a pause in said first feeding step by cutting into at least one end of the intermediate area of the cover of the wire by first cutters in intermediate stripping means disposed upstream from said feeding means in the wire-feeding direction; and cutting-off the wire fed from said feeding means during a pause in said first feeding step by second cutters in end-treating means disposed downstream from said feeding means in the feeding direction.

The wire-travelling path between said intermediate stripping means and said feeding means is set so that the equation $L3 = nL1 + L2$ is satisfied, wherein n is an integer more than zero, L1 is the length of the cut-off wire, L2 is the length from the end of the cut-off wire to one end of the intermediate area, and L3 is the distance from the cutting-into position of said first cutters to the cutting-off position of said second cutters. The second and third steps are commenced after the first step of intermittently feeding the wire by the given length L1 has been completed.

In the harness producing apparatus of the present invention, since the adjusting means of the wire-travelling path is disposed between the stripping means and the end-treating means, it is possible to simultaneously position the first and second wire cutters by setting the wire-travelling path so that the equation $L3 = nL1 + L2$ is satisfied and by feeding the wire by the corresponding length of the cut-off wire in a single feed in a cycle by the feeding means. Here, n is an integer more than zero, L1 is the length of the cut-off wire, L2 is the length from the end of the cut-off wire to one end of the intermediate area, and L3 is the distance from the cutting-into position of the first cutters to the cutting-off position of the second cutters.

Also, since the stripping and cutting-off treatments are carried out automatically, it is possible to stabilize the quality of the harness and it is not necessary to transfer the wire between the stripping treatment and the cutting-off treatment, thereby reducing the number of steps.

According to the harness producing method of the present invention, the same effect as that of the above apparatus can be obtained, since the wire-travelling path between said intermediate stripping means and said feeding means is set so that the equation $L3 = nL1 + L2$ is satisfied. Here, n is an integer more than zero, L1 is the length of the cut-off wire, L2 is the length from the end of the cut-off wire to one end of the intermediate area, and L3 is the distance from the cutting-into position of the first cutters to the cutting-off position of the second cutters.

DETAILED DESCRIPTION OF THE PREFERRED EMBODIMENTS

Figure 1:
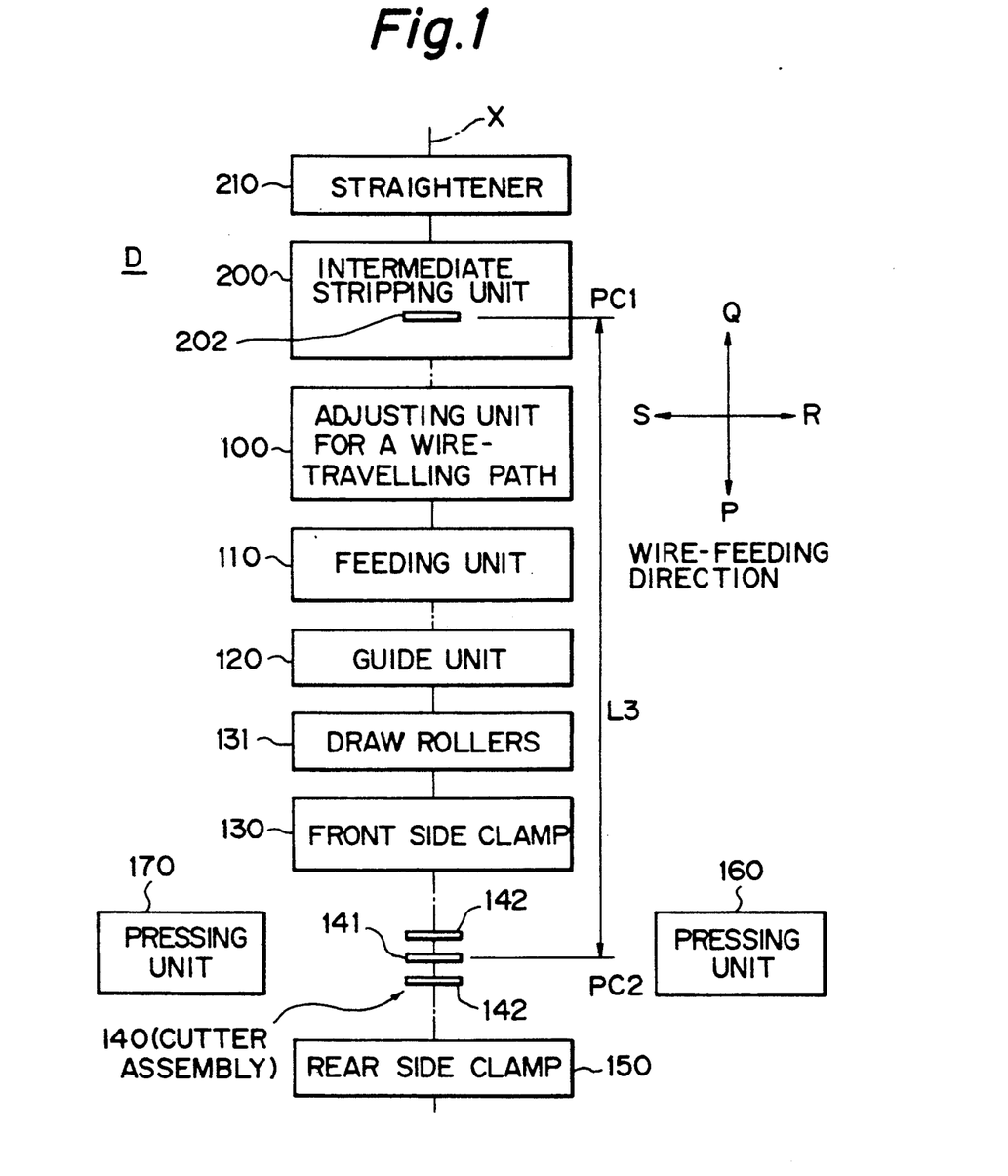
FIG. 1 is a schematic plan view of a first embodiment of a harness producing apparatus in accordance with the present invention.
Figure 2:
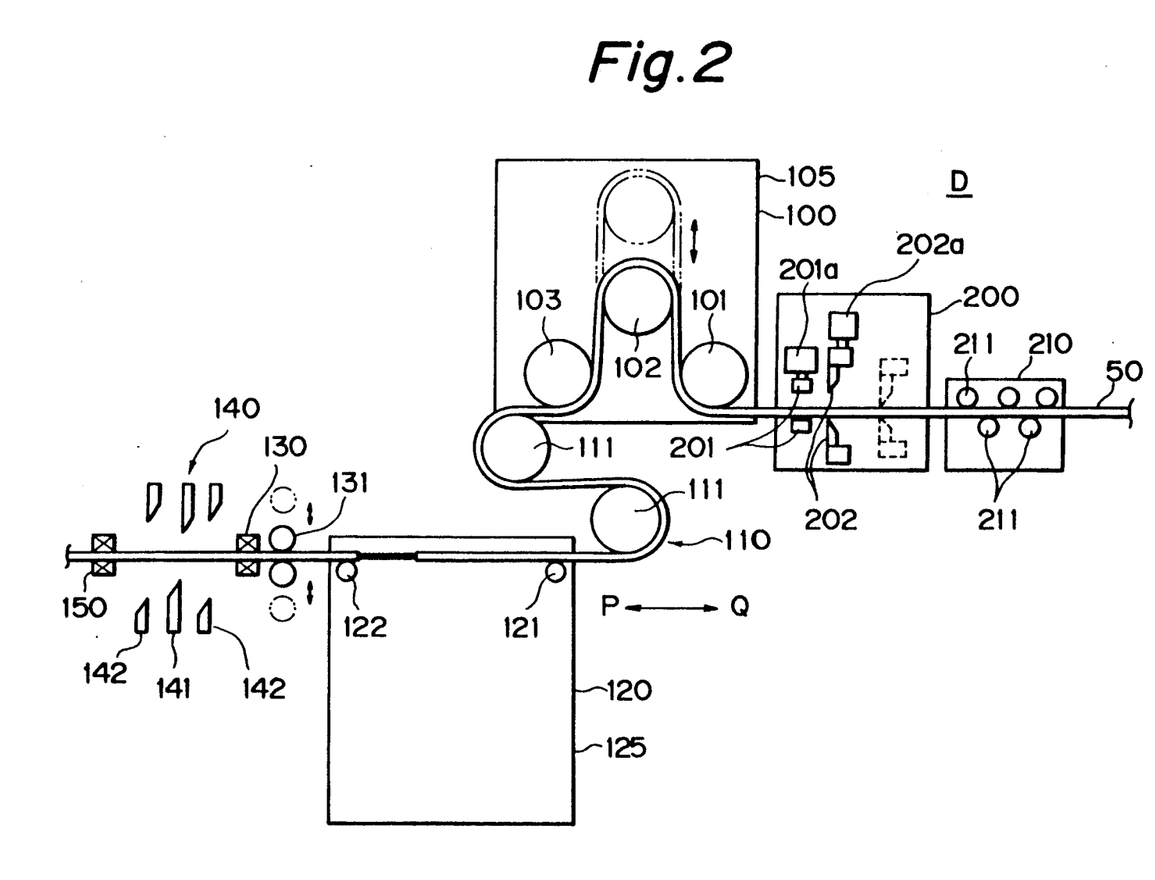
FIG. 2 is a schematic side view of the first embodiment of the harness producing apparatus.
Figure 3:
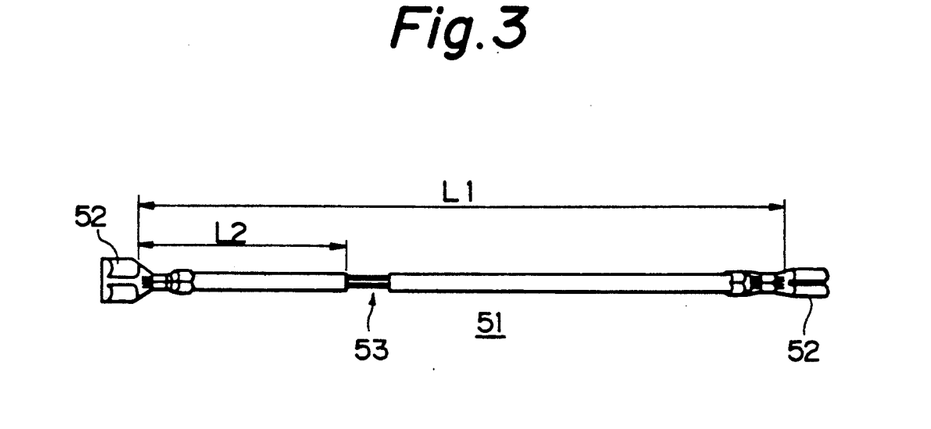
FIG. 3 is a plan view of a harness which is produced by the first embodiment of the harness producing apparatus.

An embodiment of the present invention will be explained by referring to FIGS. 1 to 17. FIG. 1 is a schematic plan view of a first embodiment of a harness producing apparatus D in accordance with the present invention. FIG. 2 is a schematic side view of the first embodiment of the harness producing apparatus D. FIG. 3 is a plan view of a harness 51 which is produced by the first embodiment of the harness producing apparatus D.

As shown in the drawings, the harness producing apparatus D is provided along a wire-passing line X with, in order, a straightener 210, an intermediate stripping unit 200, an adjusting unit 100 for the wire-travelling path, a feeding unit 110, a guide unit 120, draw rollers 131, a front side clamp 130, a cutter assembly 140, and a rear side clamp 150. A pair of terminal-pressing units 160 and 170 are disposed on both sides of the cutter assembly 140. A wire 50 which is intermittently fed by the feeding unit 110 is passed, in order, through the straightener 210, the intermediate stripping unit 200, the adjusting unit 100 for the wire-travelling path, the feeding unit 110, the guide unit 120, the draw rollers 131, and the front side clamp 130, so that the treatments mentioned below are carried out on the wire to produce the harness 51 shown in FIG. 3 on the opposite ends of which terminals 52 are pressed and the cover of which is stripped at an intermediate area 53.

The feeding unit 110 has two rotatable feed rollers 111. When the feed rollers 111, with the wire 50 wound around the rollers 111 in an S-like shape, are driven by a driving means (not shown), the wire 50 is fed in a longitudinal direction shown by the arrow P (hereinafter referred to as the wire-feeding direction P) in correspondence with the number of revolutions.

The straightener 210 is provided with a plurality of rollers 211 along both sides of the wire-passing line X. The wire 50 drawn from a stock reel (not shown) is passed through the rollers 211 so that residual bending stress in the wire is eliminated.

The intermediate stripping unit 200 is provided with a clamp 201 which is driven by a cylinder 201a to hold and release the wire 50 on the wire-passing line X, and a pair of cutters (first cutters) 202 which cut into the outer cover of the wire 50. The cutters 202 are opened and closed by a cylinder 202a and moved along the wire-passing line X.

The adjusting unit 100 for the wire-travelling path is provided with three rollers 101, 102, and 103 rotatably supported in a body 105. The central roller 102 of the three rollers is supported so that it can move up and down and it can be fixed at any moving position by a securing means (not shown). The length of the wire-travelling path in the adjusting unit 100, namely between the intermediate stripping unit 200 and the feeding unit 110, is freely set by winding the wire 50 under both side rollers 101 and 103 and over the central roller 102 and by vertically changing the fixed position of the central roller 102.

The guide unit 120 is provided with two guide rollers 121 and 122 spaced and rotatably supported on an upper portion of a body 125. The wire 50 fed from the feed rollers 111 is loosely spanned between the guide rollers 121 and 122, thereby resting the wire 50 therebetween until the wire 50 is fed by the draw rollers 131 mentioned below.

A pair of draw rollers 131 can be moved away from and toward each other and can clamp the wire 50 on the wire-passing line X. The draw rollers 131 are driven by a driving means (not shown) while clamping the wire 50, so that the wire 50 is fed in the feeding direction P.

The front side clamp 130 is adapted to clamp and release the wire 50 on the wire-passing line X and is moved in a horizontal plane including the wire-passing line X by a driving means (not shown).

The cutter assembly 140 is provided with a pair of cutters (second cutters) 141, which serve to cut off the wire 50 on the wire-passing line X, and two pairs of cutters 142 which are disposed on both sides of the cutters 141 and serve to cut into the outer cover of the wire 50. The cutter assembly 140 can open and close the cutters 141 and 142 in synchronization with each other by a driving means (not shown).

Thus, the end-treating device is composed of the cutter assembly 140 and the terminal-pressing units 160 and 170.

The rear side clamp 150 is adapted to clamp and release the wire 50 on the wire-passing line X and is moved in a horizontal plane including the wire-passing line by a driving means (not shown).

In the harness producing apparatus D, each of the driving means is connected to a controller (not shown) so that the respective driving means can effect the respective operations described hereinafter in accordance with respective output signals from the controller.

An operation of the harness producting apparatus D will be explained below by referring to the timing chart shown in FIG. 5.

Prior to starting the operation, the wire 50 is drawn out of the stock reel (not shown) and passed through rollers 211 in the straightener 210, the pair of cutters 202 in the intermediate stripping unit 200, and the clamp 201. Further, the wire 50 is wound under the roller 101, over the roller 102, and under the roller 103 in the adjusting unit for the wire-travelling path, and then wound around the two feed roller 111 in the S-like path. The wire 50 is further passed through two guide rollers 121 and 122 in the guide unit 120, the pair of draw rollers 131, the front side clamp 130, the cutters 141 and 142 in the cutter assembly 140, and the rear side clamp 150. At this time, the clamp 201 in the intermediate stripping unit 200 and the clamps 130 and 150 in the end-treating device release the wire, while the pair of draw rollers 131 are moved to the position shown by an imaginary line in FIG. 2 to release the wire 50.

Figure 4:
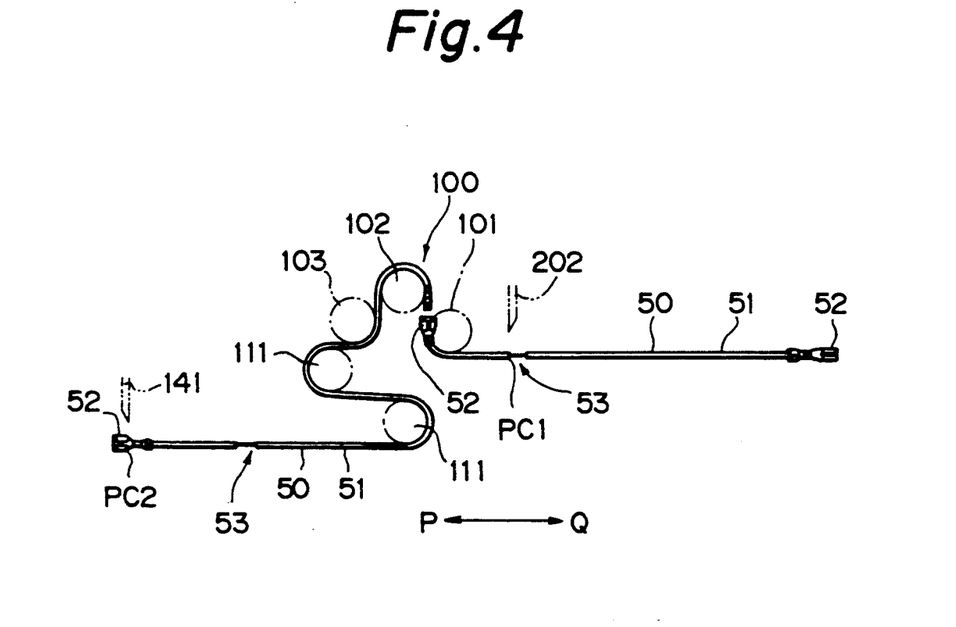
FIG. 4 is an explanatory view illustrating a manner of setting a wire-travelling path in the first embodiment.

Assuming that L1 (see FIG. 3) is the length of the wire of the harness 51 to be produced, L2 is the length from an end of the wire to an end of the intermediate stripping area of the harness (hereinafter referred to as intermediate stripping position), and L3 (see FIGS. 1 and 4) is the distance from a cutting-into position PC1 to be cut into by the cutters 202 for intermediate stripping to a cutting-off position PC2 to be cut off by the cutters 141 along the wire-passing line X (that is, the wire-travelling distance), the roller 102 in the adjusting unit 100 for the wire-travelling path is positioned so that the equation $L3 = L1 + L2$ is satisfied, as shown in FIGS. 1, 3, and 4. When the position of the wire to be cut off is disposed in opposition to the top edges of the cutting-off cutters 141, the end of the wire to be stripped in the intermediate area is disposed in opposition to the top edges of the cutters 202.

Figure 5:
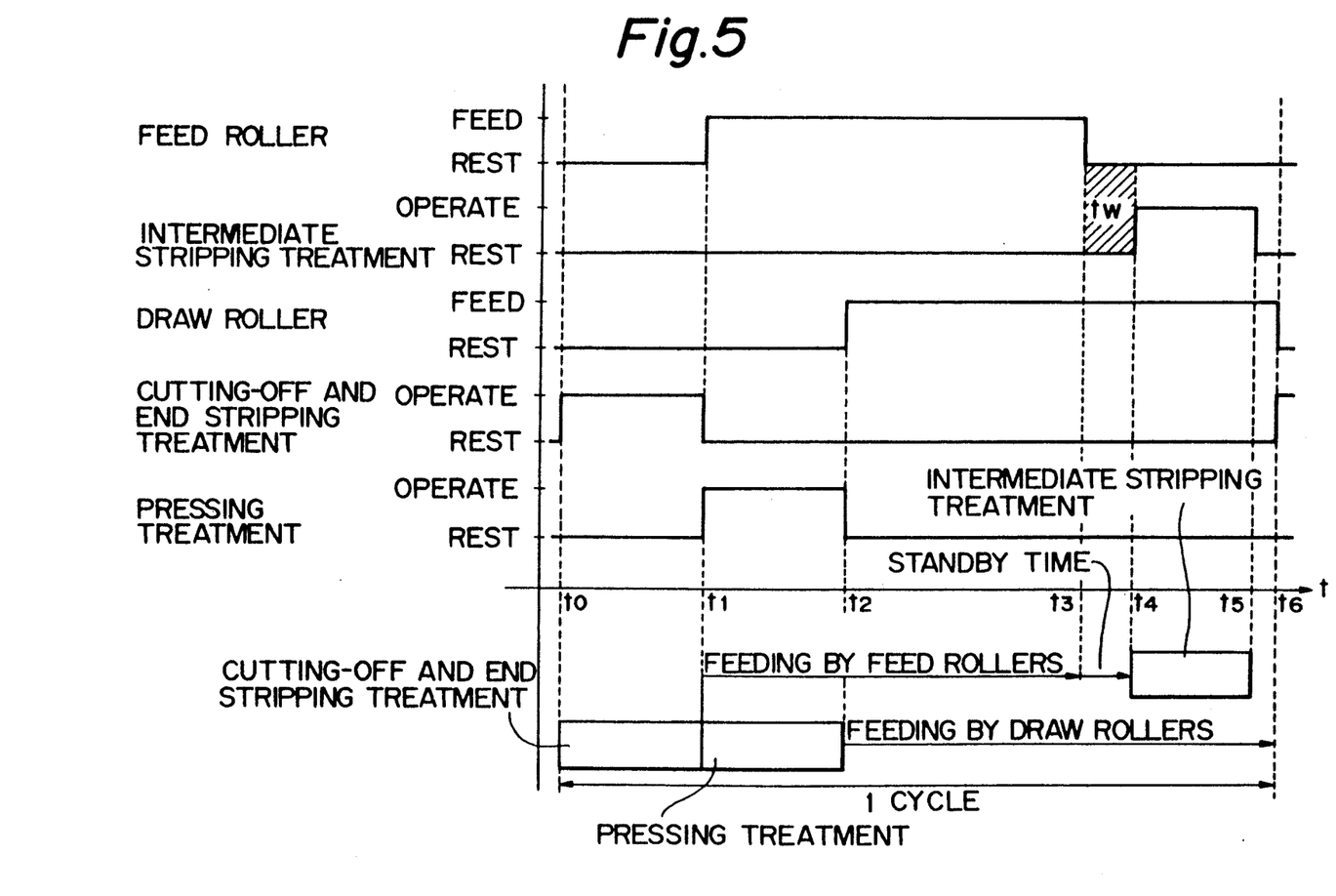
FIG. 5 is a time chart illustrating an operation of the first embodiment of the harness producing apparatus.
Figure 6:
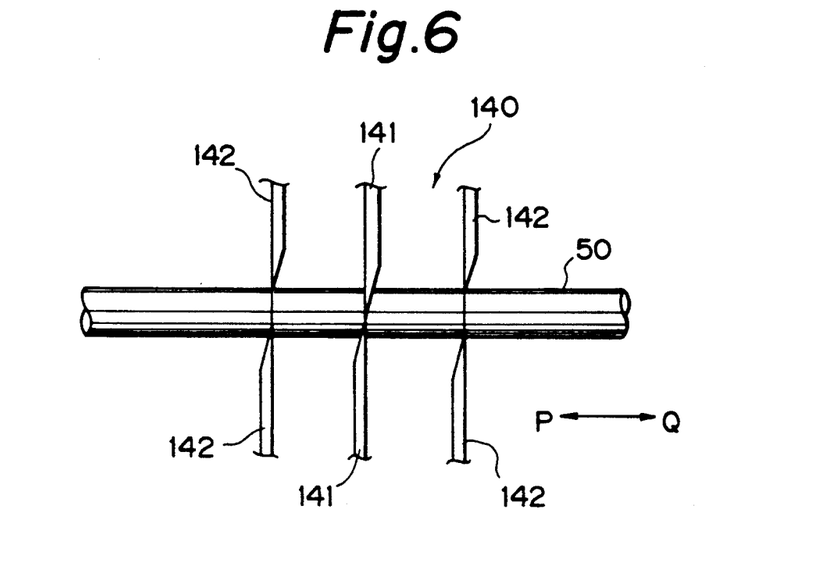
FIG. 6 is an explanatory view illustrating the operation of the first embodiment of the harness producing apparatus.

When an operation start signal is applied to the controller, the cutting-off cutters 141 and the cutting-into cutters 142 are simultaneously closed and the wire 50 is cut off by the cutters 141 at the position to be cut off as shown in FIG. 6, after the wire 50 is held by the front and rear clamps 130 and 150, as shown in times $t_0$ to $t_1$ in FIG. 5. The outer cover of the wire 50 is cut into by the cutters 142 at both sides of the cutting-off position.

Figure 7:
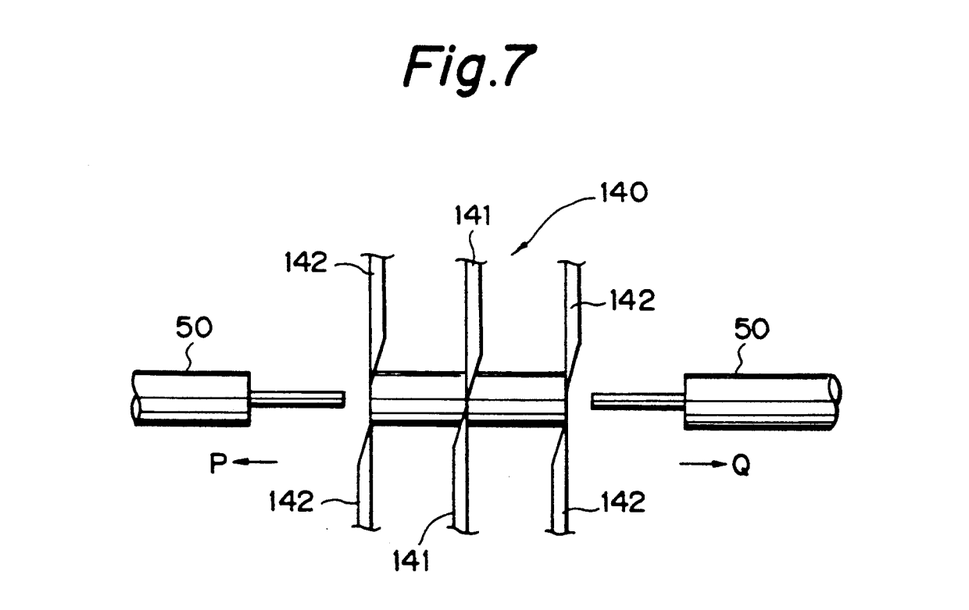
FIG. 7 is an explanatory view illustrating the operation of the first embodiment of the harness producing apparatus.

In addition, as shown in FIG. 7, the front side clamp 130 is moved in the direction Q opposite to the feeding direction P while maintaining the cutting-into position, so that the cover of the wire 50 held by the clamp 130 (hereinafter referred to as remaining wire 50) is stripped at the downstream side end relative to the feeding direction P. In connection with this operation, the rear side clamp 150 is moved in the direction P, so that the cover of the wire 50 held by the clamp 150 (hereinafter referred to as cut-off wire 50) is stripped at the upstream side end relative to the feeding direction P (cutting-off and end-stripping treatments).

Figure 8:
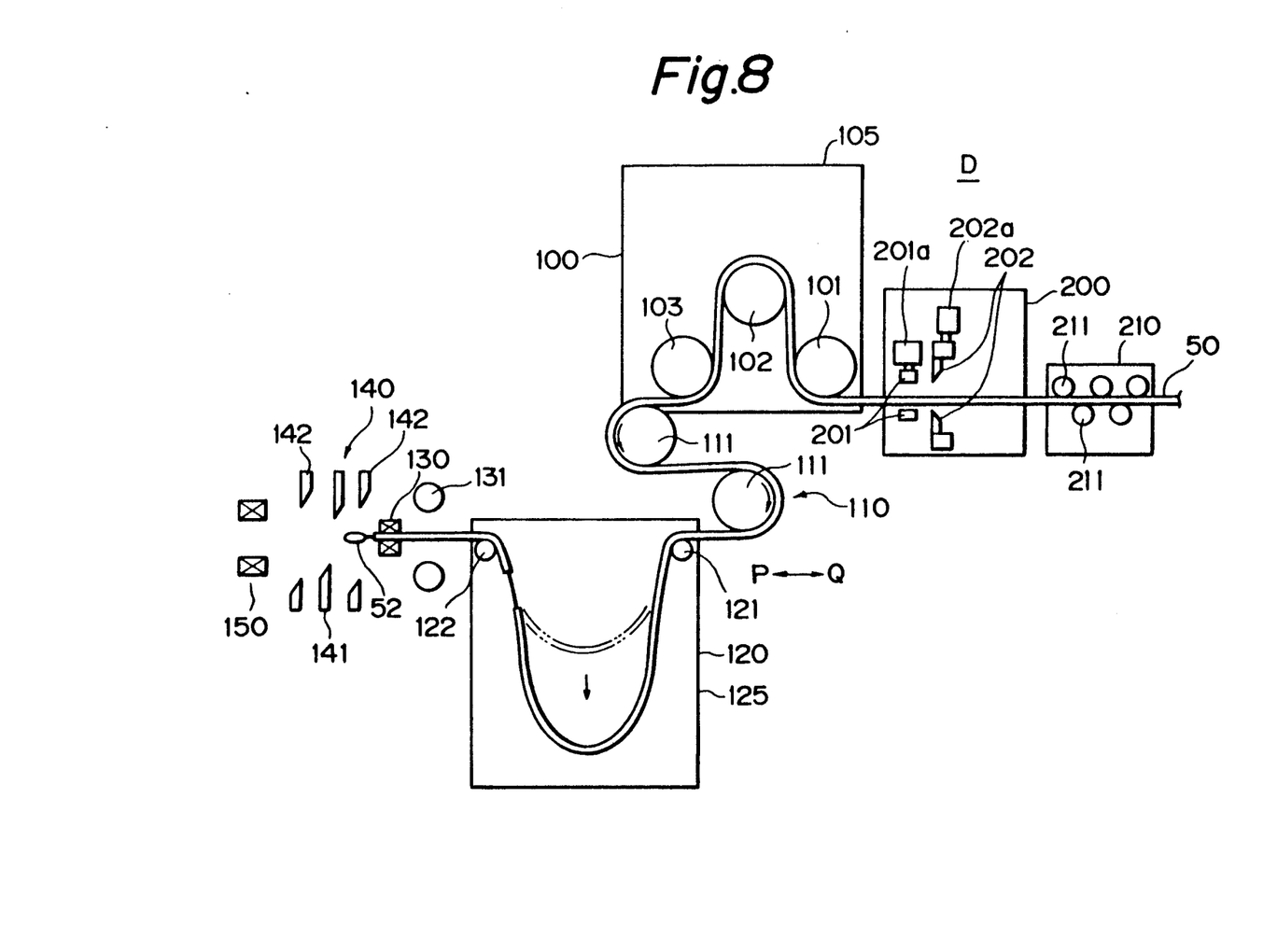
FIG. 8 is a side view of the first embodiment of the harness producing apparatus, which illustrates the operation of the first embodiment.
Figure 9:
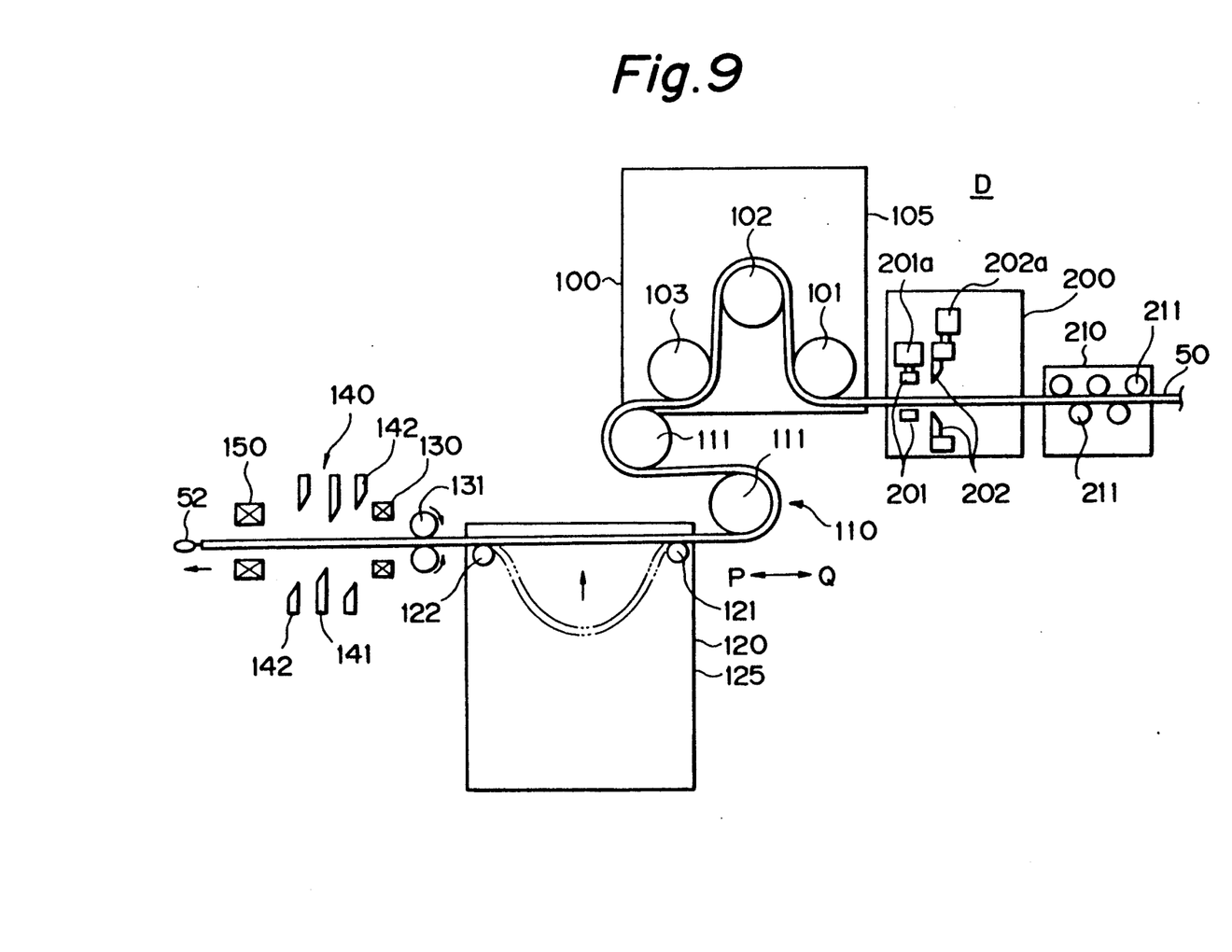
FIG. 9 is a side view of the first embodiment of the harness producing apparatus, which illustrates the operation of the first embodiment.

At the time $t_1$, the wire starts being fed by the feed rollers 111 as shown in FIG. 8 and at times $t_1$ to $t_2$ in connection with the feeding, the terminal-pressing treatment is carried out. That is, the front side clamp 130 holding the remaining wire 50 is moved to the right, as shown by the arrow R in FIG. 1, toward the terminal-pressing unit 160, and the unit 160 presses the terminal 52 on the stripped end of the remaining wire 50. Then, the front side clamp 130 is moved to the left (direction S) toward the terminal-pressing unit 170 and the terminal 52 is pressed on the stripped end of the cutting-off wire 50. The rear clamp 150 releases the wire 50 and discharges the wire 50 at a given discharge position and then returns to the original position on the wire-passing line X. The wire 50 fed by the feed rollers 111 forms a catenary between the guide rollers 121 and 122 in the guide units 120 while carrying out the terminal-pressing treatment.

At a time $t_2$ when finishing the terminal-pressing and discharging treatments, the front side clamp 130 releases the wire 50 while the draw rollers 131 clamp and drive the remaining wire 50, thereby commencing the feed of the remaining wire 50 by the draw rollers 131.

At a time $t_3$ when the wire 50 is fed by length L1 by the feed rollers 111 during times $t_1$ to $t_3$, the feeding of the wire 50 by the feed rollers 111 is stopped. Thus, by the feeding of the wire 50 by length L1 by the feed rollers 111, the end of the wire 50 to be intermediately stripped at a next time is disposed at the top edges of the cutters 202 for intermediate stripping.

Figure 10:
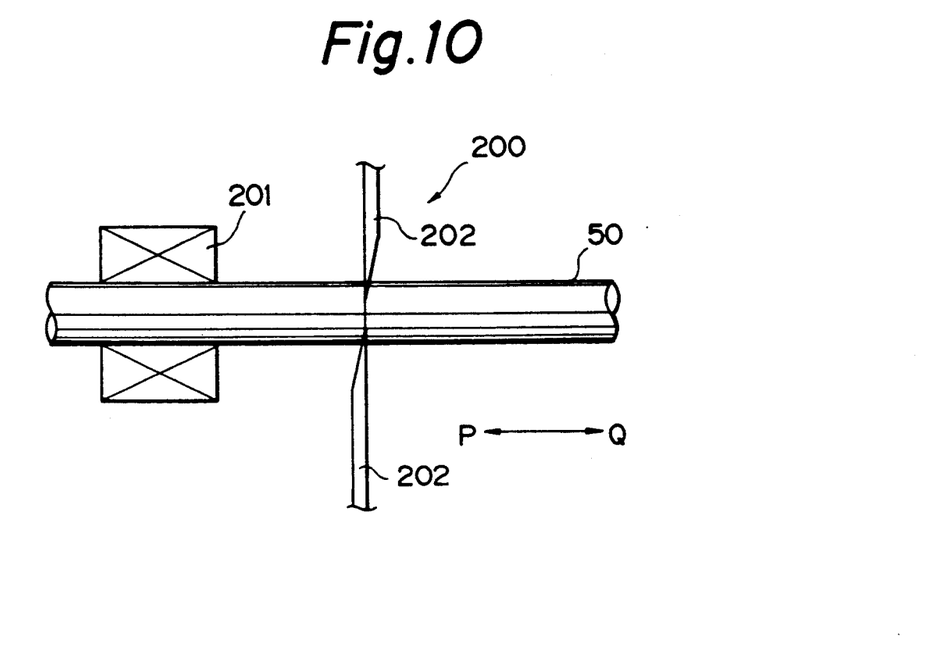
FIG. 10 is a side view of the first embodiment of the harness producing apparatus, which illustrates the operation of the first embodiment.
Figure 11:
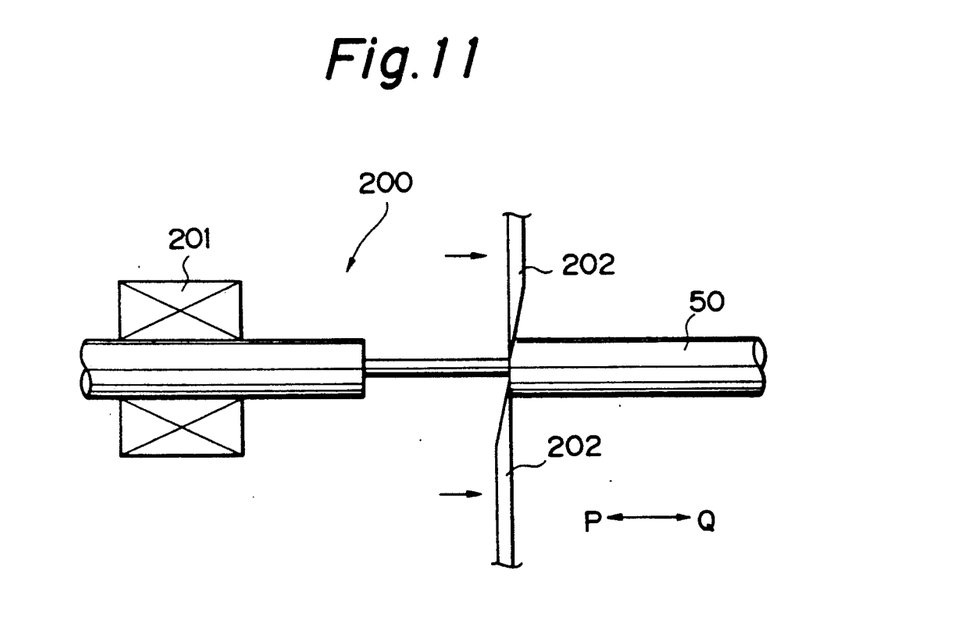
FIG. 11 is a side view of the first embodiment of the harness producing apparatus, which illustrates the operation of the first embodiment.

From the time $t_3$, when the wire-feeding by the feed rollers 111 has just finished, to a time $t_4$, the intermediate stripping unit 200 rests for a period tw in order to prepare the operation, and the intermediate stripping treatment is started at the time $t_4$. After the clamp 201 in the intermediate stripping unit 200 holds the wire 50 as shown in FIG. 10, the cutters 202 are closed so that the cutters cut into the outer cover at an end of the intermediate area. The cutters 202 are moved to the other end of the intermediate area in the direction Q shown in FIG. 11 with the cutters cutting into the cover, so that the cover on the intermediate area is cut off from the remaining cover at one end and compressed to the other end, thereby removing the cover at the intermediate area. Thus, the intermediate stripping treatment is completed (at a time $t_5$).

Next, at a time when the draw rollers 131 feed the wire 50 by length L1 during the times $t_2$ to $t_6$, the pair of draw rollers 131 are stopped and spaced so that the feeding of the wire 50 is completed (see FIG. 2). Consequently, the catenary of the wire 50 formed between the guide rollers 121 and 122 in the guide unit 120 is eliminated. When the wire 50 is fed by length L1 from the front side clamp 132 to the rear side clamp 150, the position of the wire 50 to be cut off at a next time is disposed in opposition to the top edges of the cutters 141 in the cutter assembly.

Thus, an operation cycle is completed. By repeating the above operation, the harness 51, on opposite ends of which terminals are pressed and the cover of which is stripped at the intermediate area, is successively produced.

In the harness producing apparatus D, the adjusting unit 100, which can adjust the wire-travelling path, is disposed between the feed rollers 111 and the intermediate stripping unit 200, and the wire-travelling path is set by the adjusting unit 100 so that the distance L3 of the wire 50 from the cutting-off position by the cutters 141 to the cutting-into position by the cutters 202 is equal to the sum of the cutting-off length L1 of the wire 50 and the intermediate stripping position L2. Accordingly, it is possible to simultaneously position the wire 50 with respect to the cutters 141 and 202 only by the feeding of the wire 50 by the feed rollers 111 (and the draw rollers 131) by the cutting-off length (L1) at one time in a cycle. The feeding and stopping of the wire by the feed rollers 111 is required only one time in the cycle. Consequently, the resting period from the time when the feed rollers have just been stopped to the time when the next treatment is to be started will occur at only one time in the cycle, and the harness 51 can be efficiently produced in a reduced period of time for the cycle.

Since these series of processes are automatically effected, it is possible to stabilize the quality of the harness and to eliminate the process of transferring the wire between the intermediate stripping treatment and the end-treatment.

Figure 12:
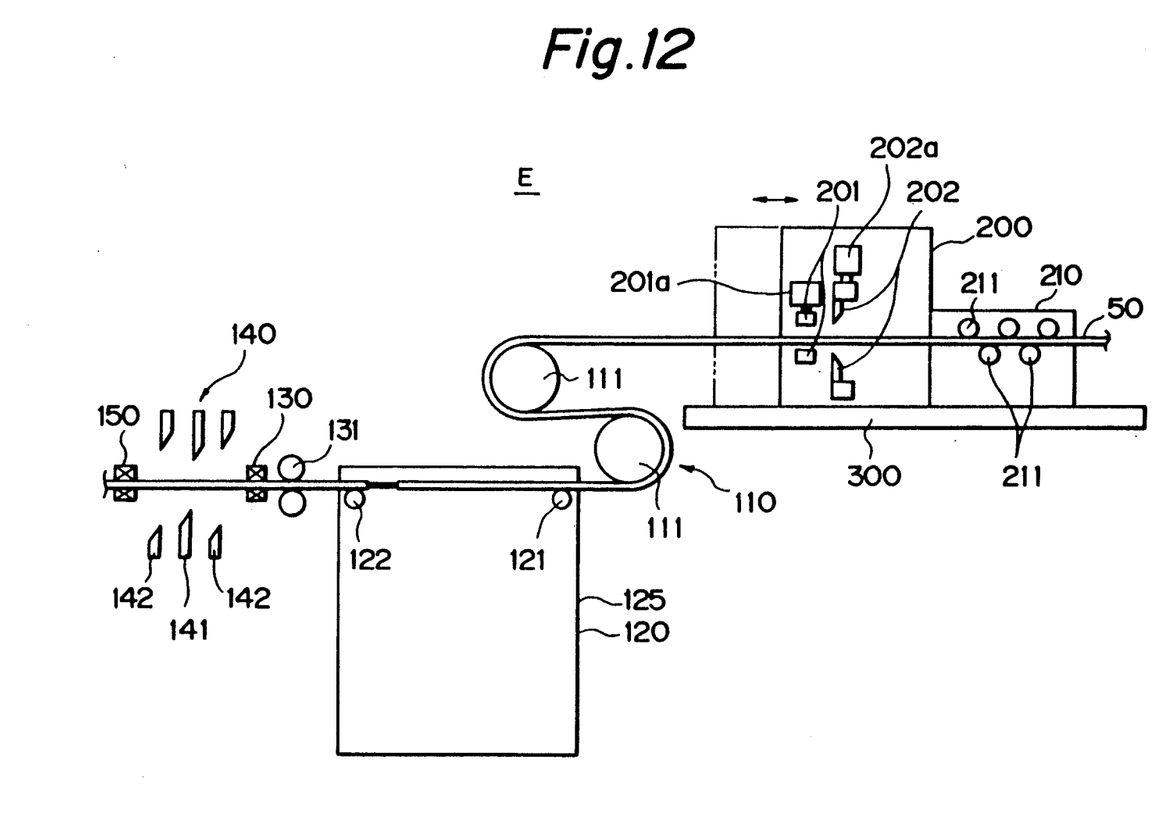
FIG. 12 is a schematic side view of a second embodiment of the harness producing apparatus in accordance with the present invention.

FIG. 12 shows a schematic side view of a second embodiment of the harness producing apparatus E of the present invention.

The harness producing apparatus E is provided in the wire-passing line with, in order, a straightener 210, an intermediate stripping unit 200, feed rollers 111, a guide unit 120, draw rollers 131, a front side clamp 130, a cutter assembly 140, and a rear side clamp 150, in the same manner as the apparatus D of the first embodiment. The intermediate stripping unit 200 and the straightener 210 are supported movably along the wire-passing line by an adjusting unit 300 for the wire-travelling path and fixed at any moving position by a securing means (not shown).

The other constructions are the same as those of the apparatus D of the first embodiment.

In the harness producing apparatus E, the intermediate stripping unit 200 and the straightener 210 are moved with respect to the feed rollers 111 by the adjusting unit 300 for the wire-travelling path. The wire-travelling path between the feed rollers 111 and the intermediate stripping unit 200 is set so that the wire arranging distance L3 from the cutting-into position by the cutters 202 for intermediate stripping to the cutting-off position by the cutters 141 is equal to the sum of the cutting-off length L1 of the wire 50 and the intermediate stripping position L2 of the wire 50. The harness 51 is produced in the same manner described above.

In the harness producing apparatus E, it is also possible to simultaneously position the wire 50 with respect to the cutters 141 and 202 by an actuation of the feed rollers 111 in a cycle, thereby reducing the total resting period and efficiently producing the harness 51.

Although the wire-travelling path is set in the above embodiments so that the equation L3=L1+L2 is satisfied, it is possible to obtain the same effects as in the above embodiments by setting the wire-travelling path so that the equation L3=nL1+L2 (n is an integer more than zero) is satisfied.

Although the cutters 202 cut into an end of the intermediate area of the wire 50 in the intermediate stripping treatment in the above embodiments, the intermediate treatment may be effected by cutting into the other end of the intermediate area of the wire 50 by the cutters 202, and by moving the wire 50 at the one end of the intermediate area (in the wire-feeding direction P).

Although in the above embodiments the cutters 202 cut into an end of the intermediate area of the wire 50 (FIG. 10), and the cutters 202 are moved to the other end of the intermediate area while continuing to cut into the cover so that the cover on the area is compressed in order to remove the cover on the area (FIG. 11), the intermediate stripping method is not limited to the above processes.

Figure 13:
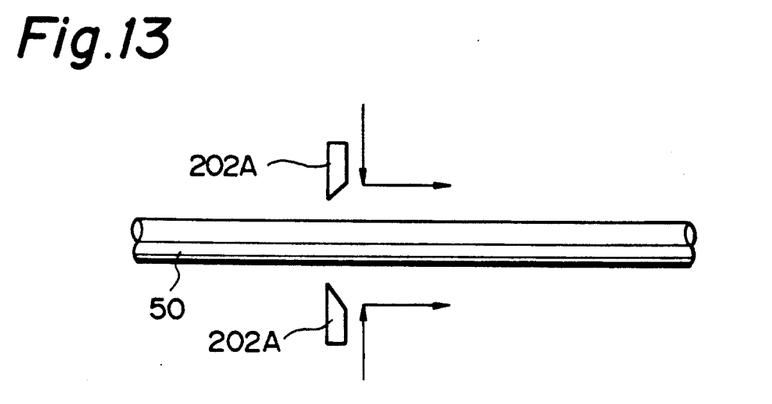
FIG. 13 is an explanatory view illustrating an operation of stripping the cover on an intermediate area of the wire in an alternation of the present invention.
Figure 14:
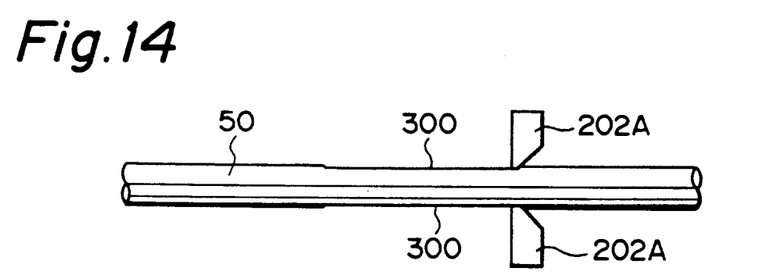
FIG. 14 is an explanatory view illustrating an operation of stripping the cover on an intermediate area of the wire in an alternation of the present invention.
Figure 15:
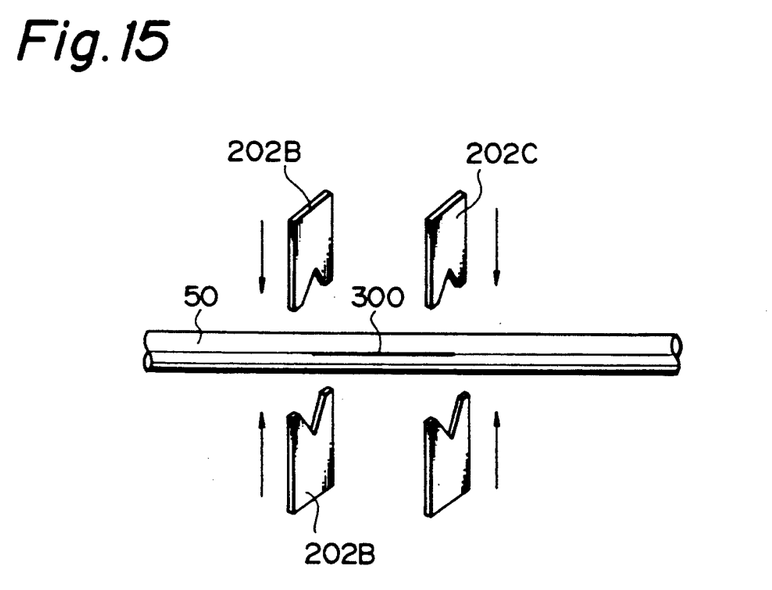
FIG. 15 is an explanatory view illustrating an operation of stripping the cover on an intermediate area of the wire in an alternation of the present invention.
Figure 16:
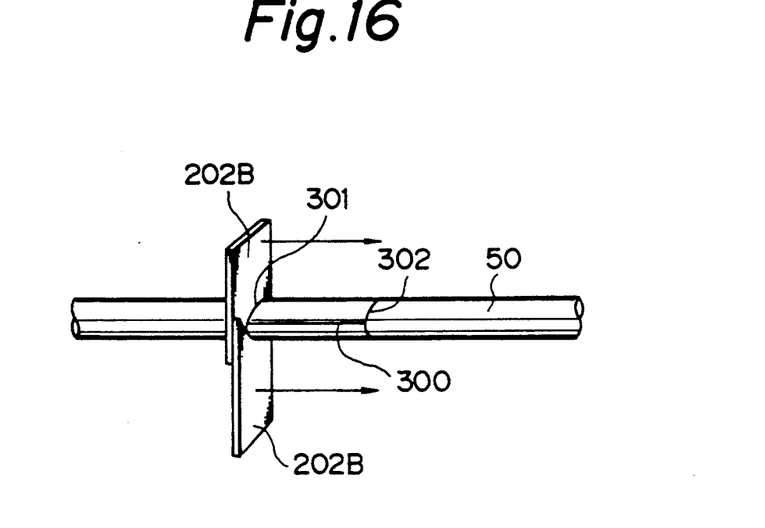
FIG. 16 is an explanatory view illustrating an operation of stripping the cover on an intermediate area of the wire in an alternation of the present invention.
Figure 17:
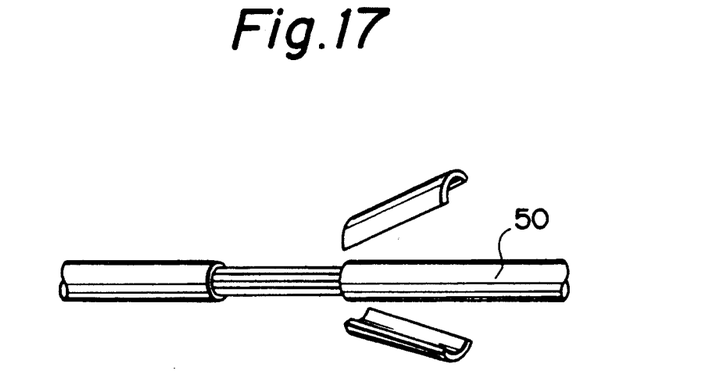
FIG. 17 is an explanatory view illustrating an operation of stripping the cover on an intermediate area of the wire in an alternation of the present invention.

For example, as shown in FIG. 13, breaking cutters 202A cut into an end of the intermediate area on the cover and the breaking cutters 202A are moved to the other end of the intermediate area as shown in FIG. 14, thereby forming a broken portion 300 along the intermediate area of the wire 50 (breaking treatment). Then, as shown in FIG. 15, cutters 202B cut into the outer cover of the wire 50 at an end of the intermediate area to form an annular slot 301 (see FIG. 16) on the end of the intermediate area (end cutting-into treatment), while cutters 202C cut into the outer cover of the wire 50 at the other end of the intermediate area to form an annular slot 302 (see FIG. 16) on the other end of the intermediate area (other end cutting-into treatment). As shown in FIG. 16, after the cutters 202C are opened, the cutters 202B are moved to the other end of the intermediate area, thereby stripping the cover at the intermediate area, as shown in FIG. 17. In this case, the order of breaking treatment, the end cutting-into treatment, and the other end cutting-into treatment may be freely elected. Further, one pair of cutters may effect both of the end cutting-into treatment and the other end cutting-into treatment.

In summary, any method in which the cutters cut into at least one end of the intermediate area and the area is removed may be applied to the present invention.

The adjusting unit 100 for the wire-travelling path is not always disposed between the intermediate stripping unit 200 and the feeding unit 110, but may be disposed between the unit 200 and the cutter assembly (end treating unit) 140.

Although the above embodiments are explained with respect to forming a single intermediate area for a single harness, a plurality of intermediate areas may be formed in the harness. In this case, if a plurality of intermediate stripping units are disposed along the wire-passing line X and each of a plurality of adjusting units is disposed between the intermediate stripping units, respectively, it is possible to position the wire with respect to the cutting-off cutters and the cutting-into cutters in the cutter assembly at the same time by the feeding of the wire by the feed rollers at only one time in the cycle.

According to the harness producing apparatus of the present invention, since the adjusting unit of the wire-travelling path is disposed between the intermediate stripping unit and the end-treating unit, it is possible to simultaneously position the first and second cutters for the wire by setting the wire-travelling path on the basis of the length of the cut-off wire, the length from the end of the cut-off wire to the one end of the intermediate area, and the distance from the cutting-into position of the first cutters to the cutting-off position of the second cutters, and by the feeding of the wire by the feeding unit by the corresponding length of the cut-off wire in a single feed in a cycle. Consequently, it is possible to decrease the number of times of feeding and resting of the feed rollers, to reduce the resting period from the time immediately after stopping the feed rollers to the time of commencing the following treatment, and thus to efficiently produce the harness. In addition, since the intermediate stripping and cutting-off treatments are carried out automatically, it is possible to stabilize the quality of the harness, to eliminate the step of transferring the wire from the intermediate stripping treatment to the cutting-off treatment, and thus to reduce the number of steps.

According to the harness producing method of the present invention, the same effect as that of the above apparatus can be obtained, since the wire-travelling path between the intermediate stripping unit and the feeding unit is set so that the equation L3=nL1+L2 is satisfied. Here, n is an integer more than zero, L1 is the length of the cut-off wire, L2 is the length from the end of the cut-off wire to one end of the intermediate area, and L3 is the distance from the cutting-into position of the first cutters to the cutting-off position of the second cutters.

What is claimed is:

1. An apparatus for producing a harness in which the cover of a cut-off wire is stripped at an intermediate area, comprising:

means for intermittently feeding a wire by a given legnth along its longitudinal direction;

means for stripping the cover of the wire at an intermediate area, said means being disposed upstream of said feeding means in the wire-feeding direction and provided with first cutters adapted to cut into at least one end of the intermediate area of the cover of the wire;

means for treating an end of the wire, said means being disposed downstream from said feeding means in the wire-feeding direction and provided with second cutters adapted to cut off the wire fed from said feeding means; and means disposed between said intermediate stripping means and said end-treating means for adjusting the wire-travelling path between both of said means.

2. A method for producing a harness in which the cover of a cut-off wire is stripped at an intermediate area, comprising the steps of:

intermittently feeding a wire by a given length along its longitudinal direction by feeding means;

stripping the cover of the wire at an intermediate area during a pause in said first feeding step by cutting into at least one end of the intermediate area of the cover of the wire by first cutters in intermediate stripping means disposed upstream of said feeding means in the wire-feeding direction; and cutting off the wire fed from said feeding means during a pause in said first feeding step by second cutters in end-treating means disposed downstream from said feeding means in the feeding direction;

wherein the wire-travelling path between said intermediate stripping means and said feeding means is set so that the equation $L3 = nL1 + L2$ is satisfied, wherein n is an integer more than zero, $L1$ is the length of the cut-off wire, $L2$ is the length from the end of the cut-off wire to one end of the intermediate area, and $L3$ is the distance from the cutting-into position of said first cutters to the cutting-off position of said second cutters; and wherein said second and third steps are commenced after the first step of intermittently feeding the wire by the given length $L1$ has been completed.

* * * * *